Dec. 22, 1959    E. H. CARNARIUS ET AL    2,917,878
METHOD OF STERILE PACKING
Filed Nov. 13, 1958    2 Sheets-Sheet 1

INVENTORS.
EDWIN HENRY CARNARIUS
DAVID KAUFMAN
BY
Samuel Branch Walker
ATTORNEY.

Dec. 22, 1959     E. H. CARNARIUS ET AL     2,917,878
METHOD OF STERILE PACKING
Filed Nov. 13, 1958     2 Sheets-Sheet 2
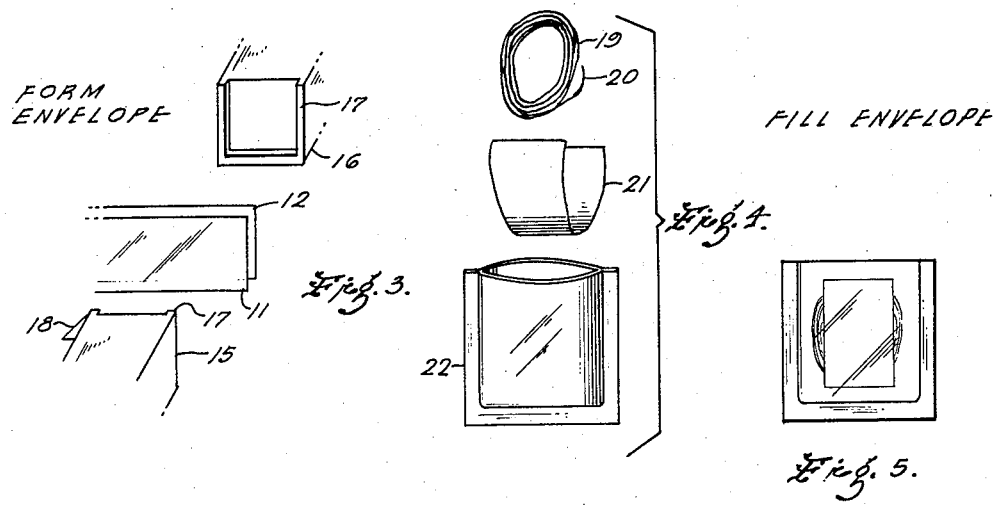
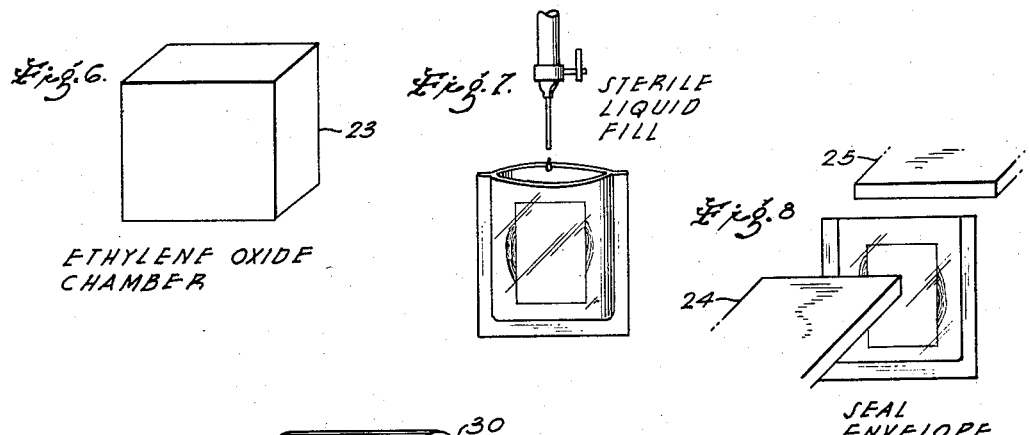
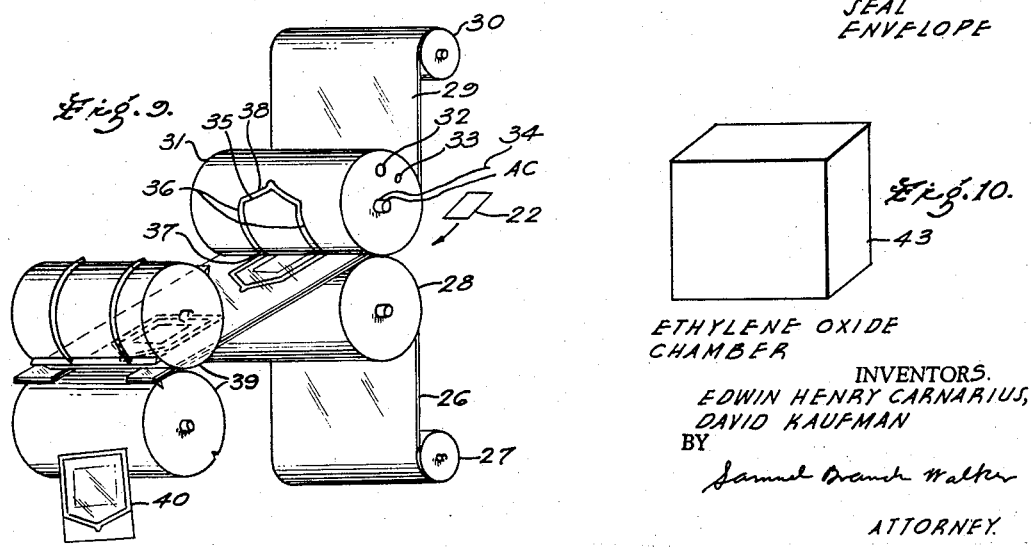
INVENTORS.
EDWIN HENRY CARNARIUS,
DAVID KAUFMAN
BY
*Samuel Branch Walker*
ATTORNEY.

2,917,878
METHOD OF STERILE PACKING

Edwin Henry Carnarius, Brookfield Center, and David Kaufman, Newtown, Conn., assignors to American Cyanamid Company, New York, N.Y., a corporation of Maine Application November 13, 1958, Serial No. 773,640

12 Claims. (Cl. 53—22)

This invention relates to a method of sterilizing surgical supplies, particularly sutures, in plastic film packages, and forming such packages; more particularly packages from laminar plastic films, the laminar plastic film having an external polyester film and an internal polyethylene or polyvinyl film using a gaseous sterilizing agent.

In the past surgical sutures have usually been sealed in glass tubes which contain a tubing liquid. Many patents show attempts to form packages from plastic materials and thus cut down on the weight of the final package and eliminate the disadvantages of having breakable glass tubes and broken glass fragments therefrom in an operating room.

Other surgical items such as hypodermic syringes, hypodermic needles, sterile bandages, etc. have been packed in various types of containers with either a comparatively high cost or a comparatively unsatisfactory package.

One of the problems has been to either pack under sterile conditions using presterilized components, or sterilize through the walls of the package. Sterile manufacturing operations are comparatively expensive as compared with the same manufacturing operations under clean but not sterile conditions, and later sterilizing through the walls of the final package.

It has now been found that economical, efficient and convenient packages are obtained by forming an envelope from a laminate of a polyester film and a polyethylene or polyvinyl film, inserting the article to be packed, sealing the envelope and then sterilizing by use of a sterilizing gas which penetrates the sealed envelope. A double envelope pack may be used in which at least one envelope has a strippable seal. For absorbable sutures, an inner envelope containing a conditioning fluid may be used. The envelopes are permeable to sterilizing gases such as ethylene oxide and are preferably protected during the sterilizing operation by retaining the sealed envelopes in a sturdy container which prevents internal gaseous pressure from unduly distorting the envelope.

The external film of the laminate is of a polyester such as the polymeric ester of ethylene glycol and terephthalic acid which is described in some detail in a patent to Swallow et al., 2,497,371, February 14, 1950, "Process of Producing Films." Such films are well known in the packaging trade and are conveniently obtainable under the trademark "Mylar." Other film forming polymers of polyhydric alcohols and polycarboxylic acids may be used. The other film of the laminate is polyethylene, either the conventional low density polyethylene or the newer more dense linear polyethylene, or a polyvinyl film such as polyvinyl chloride or polyvinyl alcohol. These films individually have been used in packaging and individually are well known. A laminate of a polyester film and a polyethylene film is sold under the trademark "ScotchPak" by Minnesota Mining and Manufacturing Company. One film which is convenient for use in the packaging of sutures has a polyester film thickness of 0.0011 to 0.0015 inch and a polyethylene film thickness of 0.003 to 0.0035 inch, this being the commercial tolerance. Thicker films are convenient for larger packages where additional rigidity and strength is desired. For sutures, hypodermic needles, small surgical dressings, and other small surgical items the thickness mentioned gives preferred packages. A polyester film thickness of about 0.0005 to 0.005 inch and a polyethylene film thickness of about 0.002 to 0.010 inch gives good results. Longer sterilizing cycles are required for the thicker films and wider seals.

Conveniently but not necessarily, the envelope is formed by bending a wider strip together as a U and sealing on two sides; or by sealing on three sides portions of two flat strips, to form open envelopes, and cutting off the envelopes at a convenient time.

The sealing is most conveniently accomplished by heating the adjacent films by contact under pressure with a bar type heat sealing machine. Roller type machines are useful in large scale production.

Polyester films alone are difficult to seal with a sealing machine in which the heat elements are in contact with the polyester film because the film tends to melt on the heating bars and interfere with production operations. Even with polytetrafluorethylene contacting members, overmelting and sticking frequently occurs, and radiant heat methods are preferred.

With the present laminate the melting point of the polyethylene or polyvinyl film is sufficiently below that of the polyester that sealing may be accomplished by applying sufficient heat that the polyethylene films soften and fuse to each other without affecting the polyester film. The polyethylene and polyvinyl films have a melting range or softening range rather than a sharp melting point and are accordingly easier to handle in heat sealing operations than films which have a sharp melting point.

Preferably the seal is one in which at least some of the polyethylene of one of the films is displaced. If not more than a minor part of the contacting polyethylene is displaced, a strong seal is obtained. By using more heat and time than is commonly accepted as desirable, the seal is in effect "oversealed" and at least part of the polyethylene is displaced from between the polyester films along the line of seal. By using one comparatively hotter surface and one cooler surface in the sealing die most of the displaced polyethylene is from a single layer and the seal is markedly weaker. This weakness of the seal is advantageously used in producing strippable packages having seals designed to be opened by pulling the films apart. A full strength seal frequently tears the films before the seal fails. The conditions for forming a strippable seal vary. The exact type of polyethylene varies considerably, inasmuch as polyethylene is a class of polymers which form films rather than a single material. With the older low density polyethylenes a lower temperature gives a good seal. With a higher density so-called linear polyethylenes a higher temperature is required to give a good seal. Similarly with a higher pressure between the sealing dies, a slightly lower temperature is satisfactory, and a long dwell time of the dies may be used to permit the use of a lower temperature or pressure. For maximum strength of seal the time, temperature, and pressure should be such that only a small amount of the polyethylene is displaced during the sealing operation. For a strippable seal the temperature, pressure, and dwell time are increased so that a considerable portion of the polyethylene is displaced. Best results are obtained with comparatively low sealing pressures, with commensurately higher sealing temperatures. Excellent results with a strippable seal are obtained if one comparatively cool die and one comparatively hot die is used and the conditions are such that substantially all of the polyethylene in the film adjacent the hot die is displaced from between the dies at the seal. At least some of the polyethylene in the film adjacent the cooler die may also be displaced. Preferably, though, the thickness of polyethylene between the polyester films is about half of the original combined polyethylene film thicknesses. Those skilled in the art can, by inspection of a seal, modify the temperature, pressure and time conditions to obtain such a seal. It is usually most convenient to use a dwell time of around 0.5 second on reciprocating dies with a pressure of about 2000 pounds per square inch over the area of the die and adjust the temperature to give the desired seal in which approximately 50% of the polyethylene is displaced. With a jaw width of 0.075 inch the dwell time may conveniently vary from less than about a quarter of a second up to two seconds or more with a pressure of 500 to 3000 pounds per square inch and a temperature of from about 275° F. to 400° F. at the die face. Above a temperature of about 400° F. the films begin to distort.

It is convenient to seal sutures in a double envelope so that the inner envelope contains the suture either dry or in a conditioning fluid. This inner envelope may be either strippable or designed to be cut open. Scissors are conveniently used for cutting open an inner envelope. The envelope may be sterilely opened using sterile scissors at the time of use by the sterile nurse.

In order to have the inner envelope sterile it is sealed in an internally sterile outer envelope. This outer envelope is dry and preferably has a strippable seal. Such a seal permits the circulating nurse to grab the lips of the outer envelope and by pulling apart the strippable seal, release the sterile inner envelope and discharge this envelope to a sterile area from which it is taken by the sterile nurse.

Hypodermic needles and other surgical instruments and dressings may be similarly sealed in either a single or a double envelope.

DRY PACK SUTURE

Conveniently an open-ended envelope is formed as indicated above and into this open-ended envelope under clean but not sterile conditions is packed a suture. A silk or other suture which is to be dry packed is coiled in an approved fashion so that it may be readily unwound at the time of use and, if the suture has a needle attached, the needle is placed where it may be readily reached. The coiled suture is folded in an identifying label and placed in the open-ended envelope. The envelope is heat sealed. This inner envelope may have a strippable seal, although such a strippable seal is not necessary. There is thus obtained a dry packed suture in a plastic envelope completely enclosed but which is not yet sterile.

Whereas polyester films in a thickness sufficient to form a self-supporting package are generally resistant to the penetration of gases, including gaseous sterilizing agents such as ethylene oxide or propylene oxide, the present envelopes are sufficiently permeable to ethylene oxide or propylene oxide to permit gaseous sterilization of the contents. Ethylene oxide penetrates faster because it has a lower molecular weight and is generally preferred for this reason. The sealed envelopes are placed in an atmosphere containing ethylene oxide or other gaseous sterilizing agent for a sufficient time to permit the sterilizing agent to penetrate the package and sterilize the interior. Most of the gaseous sterilizing agent appears to penetrate the seal rather than going through the laminate film.

The sterilizing system is conveniently a sterilizing chamber. A group of sealed envelopes is placed in a strong container which is so filled that when the container is closed the envelopes are firmly positioned and under some pressure. A perforated metal container with a locking lid may be used.

By filling the container so that the envelopes are under some compression, the envelopes are protected from swelling due to internal gas pressure.

The envelopes in the container are then placed in a sterilizing chamber. The sterilizing chamber is then evacuated to remove air. The chamber may be flushed with an inert gas such as carbon dioxide but if the chamber is evacuated to a vacuum of 25 inches of mercury or more for a period of at least 15 minutes, sufficient air is removed for safety. Enough steam is then introduced into the chamber to bring the relative humidity to about 40%, referred to atmospheric pressure, and chamber temperature of about 130° F., allowance being made for the moisture already present, and moisture absorbed. Preferably, but not necessarily, the water is allowed a period of at least about an hour to uniformly diffuse through the chamber. The sterilizing gas is then introduced. Preferably ethylene oxide diluted with carbon dioxide is used. If the ethylene oxide is diluted to about 20% ethylene oxide with about 80% carbon dioxide, the risk of explosion is minimized. Pure ethylene oxide gives excellent sterilization but is generally regarded as constituting an explosion hazard. Less than 20% ethylene oxide sterilizes more slowly. A sterilization cycle equivalent to 25 pounds per square inch gauge of the ethylene oxide-carbon dioxide mixture at 130° F. for 20 hours gives sterilization. Obviously an increase in ethylene oxide concentration or temperature permits a reduction in time. A less rigorous cycle usually gives adequate sterilization, but with surgical supplies, a factor of safety is always desirable in a sterilization cycle. The carbon dioxide-ethylene oxide mixture is then released from the sterilizing chamber, and the sterile envelopes containing the sutures may be removed.

Inasmuch as ethylene oxide is somewhat toxic to plant operators, it is preferred that before opening the chamber, carbon dioxide be allowed to fill the chamber to a pressure of 15 pounds per square inch gauge. After standing for a few minutes the gas is slowly vented to atmosphere after which the chamber may then be opened and the container removed. Dilution with $CO_2$ insures that the gas within the chamber is below the explosive limit.

This cycle takes 24 hours and is very convenient in plant operation. Obviously, modifications can be made in the sterilizing cycle by increasing the ethylene oxide concentration and temperature. Similarly, a longer cycle may be used although, it is not necessary to give complete sterilization. A continuous process may be used in which the envelopes are transferred through seals from chamber to chamber in which the various gaseous conditions are approximately equivalent to those of the various stages of the above cycle. If the pressure changes are made more gradual, the necessity for packing the envelopes in a supporting container is obviated; from a commercial production standpoint the time saved is well worth the extra effort of compression packing for the sterilization cycle.

WET PACK SUTURES

Proteinaceous absorbable surgical sutures, such as catgut sutures, are usually packed in a conditioning liquid so that the suture has the desired handling characteristics at the time of use. Even though bactericidal agents are normally used in the conditioning liquid, it is desirable to pack the sutures sterilely.

When the sutures are completely dry, they are too brittle to be handled in the operating room, but may be heat sterilized. To avoid the necessity for long sterilizing gas cycles to permit the sterilizing gas to penetrate through the suture, it is convenient to heat sterilize proteinaceous sutures in bulk. Under clean but not sterile conditions the sutures are coiled, placed in labels, and inserted in open plastic envelopes produced as above mentioned. The envelopes containing the sutures are then sterilized using a sterilizing gas. Inasmuch as the envelopes are open, compression packing is not needed and a short sterilizing cycle may be used. Conveniently, the same sterilizing cycle is used so that freshly sterilized sutures are ready to be taken from the sterilizing chamber once each working day. The open-ended envelopes containing the sutures in sterile condition are transferred to a filling line, using standard sterile procedures, filled with a conditioning liquid, and heat sealed.

Surprisingly, although the sealed envelope is sufficiently permeable to ethylene oxide or propylene oxide to be readily sterilized, the sealed envelopes may be stored for several months in dilute formaldehyde solution without the formaldehyde penetrating the seal and adversely affecting the suture.

OUTER ENVELOPE

Either the dry filled or the wet filled inner envelopes are then placed in the outer envelope. Whereas the outer envelope need not be strippable, strippable envelopes enjoy a preferred trade position. The outer envelopes may be pre-formed and the inner suture-containing envelopes inserted therein and the envelope then sealed. More conveniently the outer envelopes can be formed by running two films over forming die rolls which form the envelope and seal it as a continuous operation. The inner envelopes are stuffed into the outer envelopes as the envelopes are formed. The stuffing operation may be manual or conventional machines may be used for the purpose. The continuous strip thus formed containing a series of packages is cut into individual segments. The sealing conditions are, in general, the same as described in the manufacture of the inner envelopes, although the die roll may be slightly hotter and a shorter time used.

The sterilization of the outer envelope containing either a dry pack inner envelope or a wet pack inner envelope is substantially the same as described above for the dry pack inner envelope.

A single sterilizing cycle may be used for dry pack sutures in which the ethylene oxide or other sterilizing gas penetrates both envelopes during a single sterilizing cycle. Such a cycle is somewhat longer as the sterilizing gas must penetrate two different envelopes and hence sterilizing cycles of 48 hours or more are preferred.

When propylene oxide is used as the sterlizing gas, the length of the sterilizing cycle may be modified using test organisms to determine the minimum actual sterilizing cycle required and then allowing an appropriate factor of safety of two or more to protect against accidental process modifications and guarantee sterility under all circumstances. Similarly an adjustment must be made for the difference in diffusion rate with an interior film of polyvinyl alcohol or polyvinyl chloride instead of polyethylene.

Certain aspects of the present invention are shown in the accompanying drawings in which:

Figure 3 shows formation of an envelope from plastic strips.

Figure 4 shows the insertion of the suture and label in the envelope.

Figure 5 shows the suture and label in the envelope.

Figure 1:
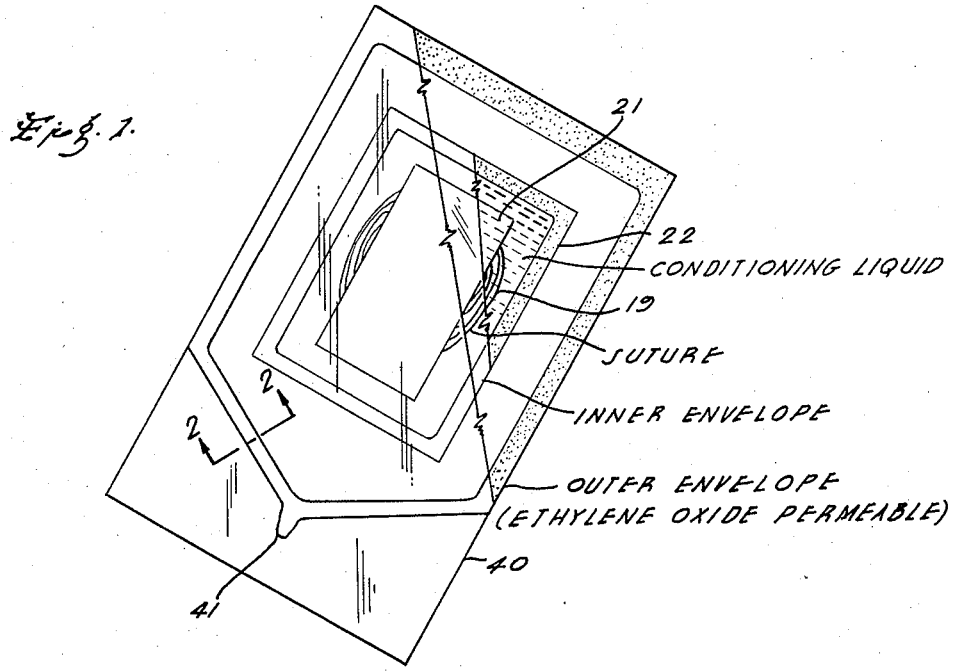
Figure 1 shows a complete wet packed suture in an inner envelope enclosed in an outer strippable envelope.

Figure 6 diagrammatically illustrates the sterilizing chamber.

Figure 7 shows the liquid filling.

Figure 8 shows the sealing of the inner envelope.

Figure 9 shows the forming of the outer envelope and simultaneous sealing of the inner envelope therein.

Figure 10 shows the sterilizing chamber for the final operation.

Referring to the drawings, certain phases of the present invention are illustrated by the following examples:

Example 1

WET DOUBLE ENVELOPE SUTURE PACKAGE

A front film 11 consisting of a polymeric ethylene glycol terephthalic ester polyester film 13 0.0015 inch thick and a low density polyethylene film 14 0.003 inch thick is brought into face to face relationship with a rear film 12 of the same composition with the polyethylene films in contact as shown in Figure 3. A heated front die 15 and a cooler rear die 16 which dies have U-shaped faces 17 are closed on the film. The front die has a temperature of 290° F. The rear die is unheated but from contact through the film with the front die warms up somewhat above room temperature. A pressure of 2000 pounds per square inch of film contacting area and a dwell time of one second are used. A cut-off knife 18 separates the envelope from the strips. There is thus formed an open-ended envelope. The suture 19 having a needle 20 thereon is heat sterilized in accordance with conventional procedures, then coiled, placed in a label 21, and inserted in the inner envelope 22.

One thousand such envelopes, as shown in Figure 5, are placed in a container which has a contamination-resistant cover and inserted in the first ethylene oxide chamber 23 which has been preheated to 130° F. Eighty containers are placed in a chamber, the chamber is sealed and evacuated to a vacuum of 27 inches of mercury. Four ounces by weight of water, as live steam, are introduced into the chamber and the system allowed to stand for one hour for moisture equilibration.

A mixture of 20% ethylene oxide and 80% carbon dioxide preheated to 130° F. is introduced into the chamber to a pressure of 25 pounds per square inch gauge. The chamber is allowed to remain at this pressure and 130° F. for 20 hours. The chamber is then evacuated to 27 inches of mercury vacuum, to remove the sterilizing mixture, and air is admitted through a bacteriological filter until the chamber reaches atmospheric pressure. The chamber is then opened, and the envelopes in the containers are transferred under sterile conditions to a sterile filling area and each envelope filled with a conditioning liquid consisting of 65% propyl alcohol, 27% ethyl alcohol, and 8% water. Still maintaining sterility the envelope is sealed between a heated front sealing die 24 and a cool rear sealing die 25.

Figure 2:
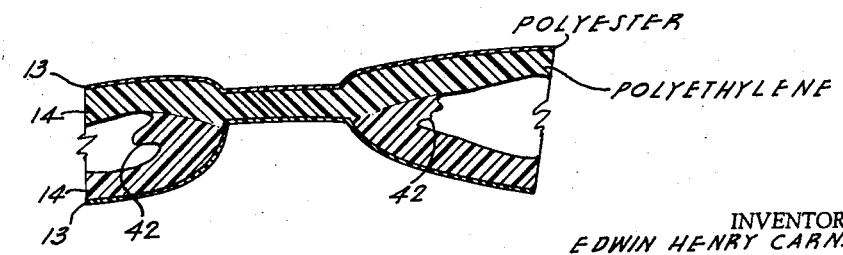
Figure 2 is an enlarged section along 2—2 of Figure 1 showing a section of a strippable seal.

A lower outer film 26 is fed as a continuous strip from a supply roll 27 over a lower die roll 28. This lower die roll, as shown in Figure 9, is conveniently a smooth roll with no provisions for heating. An upper outer film 29 from a supply roll 30 is fed over an upper die roll 31. The upper die roll has a thermostat 32 which controls a heating means 33 which may be an electric heater supplied from an appropriate source by wires 34. On the surface of the upper die roll 31 is a cathedral sealing rim 35. This rim is about 0.070 inch wide, has two parallel sides 36, a flat bottom 37, and a peaked roof 38. The upper die roll is heated to 350° F. and rotates at 10 revolutions per minute. The sealed inner envelopes 22 are fed into the bite of the roll so as to be enclosed in the outer envelope formed by the cathedral sealing rim. The insertion of the inner envelope may be by hand or conventional insertion machinery. A pair of cutting rolls 39 trims the edges of the outer films and cuts the films between envelopes thus completing the outer strippable envelope 40. The outer envelope has a point 41 at the crest of the peaked roof which serves as a concentrating point for the stresses in initially starting to strip the two films. As shown in Figure 2 taken along section line 2—2 of Figure 1, the outer films are closed together to a gap between the polyester films approximately equal to the thickness of a single polyethylene film. The flash bead 42 from the seal is displaced on either side of the seal line. By such displacement the seal is sufficiently weakened by oversealing conditions that the two films may be stripped along the seal line without risk of tearing the films.

Seven hundred such complete envelopes are placed in a sturdy container in random fashion and the container closed to compress the envelopes. Eighty chambers containing the envelopes are then placed in an ethylene oxide chamber 43 as illustrated in Figure 10. The same or different ethylene oxide chambers may be used.

The chamber, which has been preheated to 130° F., is sealed and evacuated to a vacuum of 27 inches of mercury. Four ounces by weight of water, as live steam, are introduced into the chamber, and allowed to stand for one hour for moisture equilibration.

A mixture of 20% ethylene oxide and 80% carbon dioxide is introduced to a chamber pressure of 25 pounds per square inch gauge. The chamber is held at this pressure and 130° F. for 23 hours. The chamber is then vented to atmospheric pressure, filled to 15 pounds per inch gauge with carbon dioxide, once again vented to atmospheric pressure, and the chamber is swept out with a stream of carbon dioxide to give at least two volume displacements. The chamber is opened, and the container removed. After removal from the ethylene oxide chamber the compressive container is allowed to stand unopened for 24 hours to insure that the pressure within the envelopes is sufficiently low as to not rupture the outer envelopes. The container is then opened and the final sterile packages are ready for shipment and use.

Example 2

DRY DOUBLE ENVELOPE SUTURE PACKAGE

The same equipment as described in Example 1 is used with the modification that silk sutures with needles are dry packed in the inner envelopes and the inner envelopes are heat sealed after the insertion of the suture and labels. The inner envelopes are sterilized using the cycle as described in Example 1, and thereafter sealed in outer envelopes using the same procedure the same as described for the envelopes of Examples 1.

Example 3

Nylon sutures are coiled and packed in a label in unsealed glassine envelopes. These glassine envelopes are then inserted in the outer envelopes and further treated as described in Example 1 for the sterilizing of the outer envelopes. Both the inner and outer envelope and the suture are sterile.

Whereas the examples have disclosed specifically ethylene oxide as the sterilizing gas, propylene oxide may be used or the containers may be sterilized by irradiation with an electron beam, neutrons, or X-rays.

Other modifications will be apparent to those skilled in the art which modifications coming within the scope of the appended claims are part of this invention.

We claim:

1. A method of forming sterile packages containing a surgical item in a plastic envelope of a laminate of a polyester film and a film selected from the group consisting of polyvinyl film and polyethylene film, with the faces of the film from said group in contact, placing the envelope in a sterilizing chamber, introducing a sterilizing gas having its active component selected from the group consisting of ethylene oxide and propylene oxide into said chamber, leaving the sterilizing gas in said chamber long enough to penetrate the plastic envelope, and bleeding off the sterilizing gas.

2. A method of forming sterile packages containing a surgical item in a plastic envelope of a laminate of a polyester film and a film selected from the group consisting of polyvinyl film and polyethylene film, with the faces of the film from said group in contact, placing the envelope in a sterilizing chamber, introducing ethylene oxide into said chamber, leaving the ethylene oxide in said chamber long enough to penetrate the plastic envelope, and bleeding off the ethylene oxide.

3. A method of forming sterile packages containing a surgical item in a plastic envelope of a laminate of a polyester film and a polyethylene film, with the polyethylene faces in contact, placing the envelope in a sterilizing chamber, introducing ethylene oxide into said chamber, leaving ethylene oxide in said chamber long enough to penetrate the plastic envelope, and bleeding off the ethylene oxide.

4. A method of forming sterile packages containing a surgical suture in a plastic envelope, comprising heat sealing a suture in an envelope formed from a laminate of a polyester film and a film selected from the group consisting of polyvinyl film and polyethylene film, with faces of the film from said group in contact, packing at least one such envelope in a strong container, compressing and firmly positioning the envelope in said container, placing the container with the envelope in a sterilizing chamber, evacuating said chamber, while said container protects the envelope from distortion, introducing a sterilizing gas having its active component selected from the group consisting of ethylene oxide and propylene oxide under pressure into said chamber, leaving the sterilizing gas under pressure in said chamber long enough to penetrate the plastic envelope, bleeding off the sterilizing gas, and opening the container after the internal pressure in the envelope has dropped sufficiently not to distort the envelope.

5. A method of forming sterile packages containing a surgical suture in a plastic envelope, comprising heat sealing a suture in an envelope formed from a laminate of a polyester film and polyethylene film, with polyethylene faces in contact, packing at least one such envelope in a strong container, compressing and firmly positioning the envelope in said container, placing the container with the envelope in a sterilizing chamber, evacuating said chamber, while said container protects the envelope from distortion, introducing ethylene oxide gas under pressure into said chamber, leaving the ethylene oxide gas in said chamber long enough to penetrate the plastic envelope, bleeding off the ethylene oxide gas, removing the container from the chamber, and opening the container after the internal pressure in the envelope has dropped sufficiently not to distort the envelope.

6. A method of forming sterile packages containing a surgical suture in a plastic envelope, comprising heat sealing a suture in an envelope formed from a laminate of a polyester film and a film selected from the group consisting of polyvinyl film and polyethylene film, with the faces of the film from said group in contact, packing at least one such envelope in a strong container, compressing and firmly positioning the envelope in said container, placing the container with the envelope in a sterilizing chamber, evacuating said chamber, while said container protects the envelope from distortion, introducing ethylene oxide and an inert diluent gas under pressure into said chamber, leaving the ethylene oxide under pressure in said chamber long enough to penetrate the plastic envelope, bleeding off the ethylene oxide, introducing an inert diluent gas, removing the container from the chamber, and opening the container after the internal pressure in the envelope has dropped sufficiently not to distort the envelope.

7. A method of forming sterile packages containing a surgical suture in a plastic envelope, comprising heat sealing a suture in an envelope formed from a laminate of a polyester film and a film selected from the group consisting of polyvinyl film and polyethylene film, with the faces of the film from said group in contact, packing at least one such envelope in a strong container, compressing and firmly positioning the envelope in said container, placing the container with the envelope in a sterilizing chamber, evacuating said chamber while said container protects the envelope from distortion, introducing a sterilizing gas having its active component selected from the group consisting of ethylene oxide and propylene oxide under pressure into said chamber, leaving the sterilizing gas under pressure in said chamber long enough to penetrate the plastic envelope, bleeding off the sterilizing gas, introducing an inert diluent gas, releasing gas pressure, removing the container from the chamber, and opening the container after the internal pressure in the envelope has dropped sufficiently not to distort the envelope.

8. A method of forming sterile packages containing a surgical suture in a plastic envelope, comprising heat sealing a suture in an envelope formed from a laminate of a polyester film and polyethylene film, with the polyethylene faces in contact, packing a plurality of such envelopes in a strong container, compressing and firmly positioning the envelopes in said container, to protect against damage from internal gas pressure, placing the container in a sterilizing chamber, evacuating said chamber while said container protects the envelope from distortion, introducing an ethylene oxide, carbon dioxide mixture under pressure into said chamber, leaving the ethylene oxide containing mixture under pressure in said chamber long enough to penetrate the plastic envelope, bleeding off the sterilizing gas, flushing out the ethylene oxide with carbon dioxide, removing the container from the chamber, and opening the container after the internal pressure in the envelope has dropped sufficiently not to distort the envelopes.

9. A method of forming a sterile package containing a surgical suture in a double plastic envelope comprising forming an open-ended inner envelope from a laminate of a polyester film and a film selected from the group consisting of polyvinyl film and polyethylene film with the faces of the film from said group in contact, inserting a suture in said envelope, heat sealing said envelope, packing at least one such envelope in a strong container, compressing and firmly positioning the envelope in said container, placing the container with the envelope in a sterilizing chamber, evacuating said chamber while said container protects the envelope from distortion, introducing a sterilizing gas having its active component selected from the group consisting of ethylene oxide and propylene oxide under pressure into said chamber, holding the sterilizing gas under pressure in said chamber long enough for the sterilizing gas to penetrate the plastic envelope, bleeding off the sterilizing gas, removing the container from the chamber, and opening the container after the internal pressure in the chamber has dropped sufficiently not to distort the envelope; forming an outer plastic envelope from a laminate of a polyester film and a film selected from the group consisting of polyvinyl film and polyethylene film, with the faces of the film from said group in contact, with the inner envelope in said outer envelope, forming a double envelope, packing at least one double envelope in a strong container, compressing and firmly positioning the double envelope in said container, placing the container with the double envelopes in a sterilizing chamber, evacuating the chamber, introducing a sterilizing gas having its active component selected from the group consisting of ethylene oxide and propylene oxide under pressure into the chamber, holding the sterilizing gas under pressure in said chamber long enough to penetrate at least the outer envelope, bleeding off the sterilizing gas, removing the container from the chamber, and opening the container after the internal pressure in the envelopes has dropped sufficiently not to distort the envelopes.

10. A method of forming a sterile package containing a surgical suture in a double plastic envelope comprising forming an open-ended inner envelope from a laminate of a polyester film and a polyethylene film with the polyethylene faces in contact, inserting a suture in said envelope, heat sealing said envelope, packing at least one such envelope in a strong container, compressing and firmly positioning the envelope in said container, placing the container with the envelope in a sterilizing chamber, evacuating said chamber while said container protects the envelope from distortion, introducing ethylene oxide under pressure into said chamber, holding the ethylene oxide under pressure in said chamber long enough for the sterilizing gas to penetrate the plastic envelope, bleeding off the ethylene oxide, flushing out the ethylene oxide with carbon dioxide, releasing gas pressure, removing the container from the chamber, and opening the container after the internal pressure in the chamber has dropped sufficiently not to distort the envelope; forming an outer plastic envelope from a laminate of a polyester film and polyethylene film, with the polyethylene film and polyethylene film, with the polyethylene faces in contact, with the inner envelope in said outer envelope, forming a double envelope, packing at least one double envelope in a strong container, compressing and firmly positioning the envelope in said container, placing the container with the double envelopes in a sterilizing chamber, evacuating said chamber, introducing ethylene oxide under pressure into said chamber, holding the ethylene oxide under pressure in said chamber long enough to penetrate the outer envelope, bleeding off the ethylene oxide, flushing out the ethylene oxide with carbon dioxide, releasing gas pressure, removing the container from the chamber, and opening the container after the internal pressure in the envelopes has dropped sufficiently not to distort the envelopes.

11. A method of forming a sterile package containing a surgical suture in a conditioning liquid in an inner plastic envelope in an outer plastic envelope comprising forming an open inner envelope by heat sealing a laminate of a polyester film and a film selected from the group consisting of polyvinyl film and polyethylene film with the faces of the film from said group in contact; heating suture gut until sterile, inserting sutures of said gut under clean but non-sterile conditions in said envelope, sterilizing the open envelopes and the gut therein with a sterilizing gas having its active component selected from the group consisting of ethylene oxide and propylene oxide, then under sterile conditions filling the envelope with conditioning liquid, and sealing said inner envelopes; forming an outer plastic envelope from a laminate of a polyester film and a film selected from the group consisting of polyvinyl film and polyethylene film with the faces of the film from said group in contact, with the first plastic envelope in said outer envelope, packing at least one double envelope in a strong container, compressing and firmly positioning the envelope in said container, placing the container with the double envelopes in a sterilizing chamber, evacuating said chamber, introducing a sterilizing gas having its active component selected from the group consisting of ethylene oxide and propylene oxide under pressure into said chamber, holding the sterilizing gas under pressure in said chamber long enough to penetrate the outer envelope, bleeding off the sterilizing gas, and removing the container from the chamber, and opening the container after the internal pressure in the envelopes has dropped sufficiently not to distort the envelopes.

12. A method of forming a sterile package containing a surgical suture in a conditioning liquid in an inner plastic envelope in an outer plastic envelope comprising forming an open inner envelope by heat sealing a laminate of a polyester film and polyethylene film with the polyethylene faces in contact; heating suture gut until sterile, inserting sutures of said gut under clean but non-sterile conditions in said envelope, sterilizing the open envelopes and the gut therein with ethylene oxide, then under sterile conditions filling the envelope with a conditioning liquid, and sealing said inner envelopes; forming an outer plastic envelope from a laminate of a polyester film and polyethylene film with the polyethylene faces in contact with the first plastic envelope in said outer envelope, packing at least one double envelope in a strong container, compressing and firmly positioning the envelope in said container, placing the container with the double envelopes in a sterilizing chamber, evacuating said chamber, introducing ethylene oxide under pressure into said chamber, holding the ethylene oxide under pressure in said chamber long enough to penetrate the outer envelope, bleeding off the ethylene oxide, flushing out the ethylene oxide with carbon dioxide, releasing gas pressure, removing the container from the chamber, and opening the container after the internal pressure in the envelopes has dropped sufficiently not to distort the envelopes.

References Cited in the file of this patent

UNITED STATES PATENTS

| | | |
|---|---|---|
| 2,549,040 | Adams | Apr. 17, 1951 |
| 2,634,856 | Perkins | Apr. 14, 1953 |
| 2,676,702 | Whitefoot | Apr. 27, 1954 |
| 2,738,059 | Elson | Mar. 13, 1956 |